United States Patent
Patel et al.

(10) Patent No.: US 12,327,099 B2
(45) Date of Patent: Jun. 10, 2025

(54) METHODS AND SYSTEMS FOR USING CACHED BUILDS IN SOFTWARE DEVELOPMENT

(71) Applicant: Shopify Inc., Ottawa (CA)

(72) Inventors: Pawan Patel, Stoney Creek (CA); Daniel Baxter, Stittsville (CA); Dominic Lind, Stockholm (SE)

(73) Assignee: Shopify Inc., Ottawa (CA)

( * ) Notice: Subject to any disclaimer, the term of this patent is extended or adjusted under 35 U.S.C. 154(b) by 149 days.

(21) Appl. No.: 18/314,523

(22) Filed: May 9, 2023

(65) Prior Publication Data

US 2024/0378036 A1    Nov. 14, 2024

(51) Int. Cl.
*G06F 8/41* (2018.01)

(52) U.S. Cl.
CPC ............ *G06F 8/4442* (2013.01); *G06F 8/447* (2013.01)

(58) Field of Classification Search
None
See application file for complete search history.

(56) References Cited

U.S. PATENT DOCUMENTS

| | | | |
|---|---|---|---|
| 2007/0245323 A1* | 10/2007 | Bertelrud | G06F 8/71 717/140 |
| 2009/0049430 A1* | 2/2009 | Pai | G06F 9/44589 717/140 |
| 2009/0055809 A1* | 2/2009 | Campbell | G06F 8/36 717/140 |
| 2010/0293533 A1* | 11/2010 | Andrade | G06F 8/10 717/140 |
| 2013/0066901 A1* | 3/2013 | Marcelais | G06F 16/137 707/769 |
| 2017/0017798 A1* | 1/2017 | Bhat | G06F 21/44 |
| 2017/0208150 A1* | 7/2017 | Ekbote | G06F 8/41 |
| 2018/0210712 A1* | 7/2018 | Busjaeger | G06F 8/70 |
| 2019/0114166 A1* | 4/2019 | Lakshmanan | G06F 8/71 |

* cited by examiner

*Primary Examiner* — Marina Lee

(74) *Attorney, Agent, or Firm* — Moffat & Co

(57) ABSTRACT

A method at a computing system, the method including creating a signature for a software component, the signature being created by hashing source code for the software component; checking a cache to determine whether the signature matches a cached signature; and responsive to the signature matching a cached signature, obtaining a binary for the software component from another computing system without compiling the software component.

20 Claims, 6 Drawing Sheets

METHODS AND SYSTEMS FOR USING CACHED BUILDS IN SOFTWARE DEVELOPMENT

FIELD OF THE DISCLOSURE

The present disclosure is related to software development and specifically is related to compiling software during software development.

BACKGROUND

A software development environment is a set of tools, resources, and processes used by developers to create, test, and deploy software applications. It includes everything from programming languages, development frameworks, and code editors to version control systems, testing tools, and deployment platforms.

SUMMARY

As developers are creating software, the software needs to be compiled to be tested and deployed. Specifically, compiling software is the process of transforming human-readable source code into machine-executable code that can be run on a computer. The compilation process involves taking the source code written in a programming language and translating it into a set of machine instructions that can be understood by a computer processor.

However, compiling binaries from source code may take considerable time. Further, in more complex systems in which various software components may be independently compiled, the redundant compiling of code which is unchanged wastes resources.

In accordance with embodiments of the present disclosure, systems and methods are provided in which various software components, which may be compiled independently, are assigned a signature, where the signature can be created using a hashing algorithm. Before compiling any of the software components, the source code for such component can be checked against a repository which stores binaries for compiled software components and the signature associated with such software component. Upon the signature being found to match with the signature associated with a binary in the repository, the binary may be obtained rather than compiling the source code for the software component.

Therefore, in one aspect, a method at a computing system may be provided. The method may include creating a signature for a software component, the signature being created by hashing source code for the software component. The method may further include checking a cache to determine whether the signature matches a cached signature, and responsive to the signature matching a cached signature, obtaining a binary for the software component from another computing system without compiling the software component.

In some embodiments the hashing may comprise hashing the source code and a path for a source code file containing the source code for the software component.

In some embodiments, the method may further comprise performing the hashing the source code and the path for multiple source code files, and combining results from the performing to create the signature.

In some embodiments, the hashing may comprise hashing the source code and appending a path for a source code file containing the source code for the software component.

In some embodiments, the hashing may use an MD5 hashing algorithm.

In some embodiments, the software component may be based on a development copy of a codebase, the codebase comprising source code for a plurality of software components, the plurality of software components including the software component.

In some embodiments a subset of the plurality of software components may be based on native code and a second subset of the plurality of software components may be based on web application code.

In some embodiments, the method may further comprise combining the binary downloaded from the cache with one or more binaries created by compiling a second software component.

In a further aspect, a computing device having a processor and memory for storing instruction code may be provided. The instruction code, when executed by the processor of the computing device, may cause the computing device to create a signature for a software component, the signature being created by hashing source code for the software component. The instruction code, when executed by the processor of the computing device, may cause the computing device to check a cache to determine whether the signature matches a cached signature and, when the signature matches a cached signature, obtain a binary for the software component from another computing system without compiling the software component.

In some embodiments the computing device may further be caused to, when the signature does not match a cached signature: compile source code for the software component; create a component signature for the software component; and cache the compiled source code for the software component with the component signature.

In some embodiments, the hashing may comprise hashing the source code and a path for a source code file containing the source code for the software component.

In some embodiments, the computing device may further be caused to perform the hashing the source code and the path for multiple source code files; and combine results from the performing to create the signature.

In some embodiments, the hashing may comprise hashing the source code and appending a path for a source code file containing the source code for the software component.

In some embodiments, the hashing may use an MD5 hashing algorithm.

In some embodiments, software component may be based on a development copy of a codebase, the codebase comprising source code for a plurality of software components, the plurality of software components including the software component.

In some embodiments, a subset of the plurality of software components may be based on native code and a second subset of the plurality of software components may be based on web application code.

In some embodiments, the computing device may further be caused to combine the binary downloaded from the cache with one or more binaries created by compiling a second software component.

In a further aspect, a non-transitory computer readable medium for storing instruction code may be provided. The instruction code, when executed by a processor of a computing device, may cause the computing device to create a signature for a software component, the signature being created by hashing source code for the software component. The instruction code, when executed by a processor of the computing device, may further cause the computing device to check a cache to determine whether the signature matches a cached signature and when the signature matches a cached signature, obtain a binary for the software component from another computing system without compiling the software component.

In some embodiments, the instruction code may further cause the computing device to, when the signature does not match a cached signature, compile source code for the software component; create a component signature for the software component; and cache the compiled source code for the software component with the component signature.

In some embodiments, the hashing may comprise hashing the source code and a path for a source code file containing the source code for the software component.

BRIEF DESCRIPTION OF THE DRAWINGS

The present disclosure will be better understood with reference to the drawings, in which.

DETAILED DESCRIPTION

The present disclosure will now be described in detail by describing various illustrative, non-limiting embodiments thereof with reference to the accompanying drawings and exhibits. The disclosure may, however, be embodied in many different forms and should not be construed as being limited to the illustrative embodiments set forth herein. Rather, the embodiments are provided so that this disclosure will be thorough and will fully convey the concept of the disclosure to those skilled in the art.

In some software systems, various components of the software under development may be compiled separately from other components. For example, in a cloud development environment in which development is being performed for software that may run on different operating systems or, more generally, where building or compiling the software (or one or more portions or components of the software) requires the use of different platforms, operating systems, and/or environments, the software (or the one or more portions or components of the software) may be compiled separately on more than one platform, operating system, or environment.

If a developer is building and testing an application, it is inefficient to require the developer to compile a component that was not modified (by the developer or otherwise). In this regard, it would be useful to have a repository of binary builds for software that may be used when the source code for such software has not changed.

In accordance with the embodiments of the present disclosure, a cache for binaries may be maintained, where each binary is associated with a signature for the binary. The signature can be created from the source code and uniquely identify the binary.

Computer System

Software development environments can take various forms. In some cases, a developer may develop on a local machine completely. In other cases, a developer may develop and compile on a local machine, but use a codebase or repository that is located on a network or in the cloud. In some cases, a developer may use a containerized development environment using cloud based services, and may further use functionality on a local machine as well as a local or remote codebase. Other options are possible.

Functionality for the development can occur on one or more computing devices. These include the local computing device, cloud based or network based servers, web servers, among other options.

Figure 1:
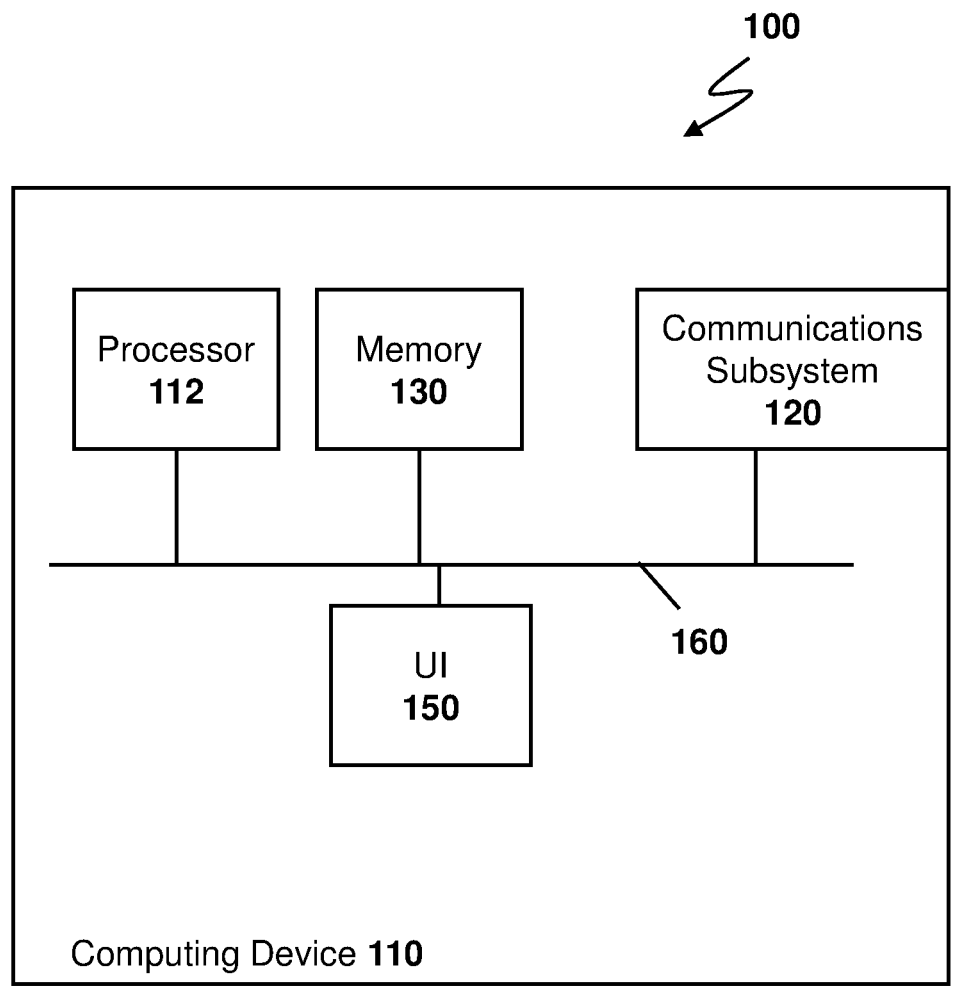
FIG. 1 is a block diagram showing an example computer device capable of being used with the embodiments of the present disclosure.

Reference is now made to FIG. 1, which shows an example, simplified, computing system 100. In the example of FIG. 1, a computing device 110 may include a processor 112 and a communications subsystem 120, where the processor 112 and the communications subsystem 120 cooperate to perform the methods of the embodiments described herein.

Processor 112 is a hardware processor configured to execute programmable logic, which may be stored, along with data, on computing device 110 and shown in the example of FIG. 1 as memory 130. Memory 130 can be any tangible, non-transitory computer readable storage medium such as optical (e.g., CD, DVD, etc.), magnetic (e.g., tape), flash drive, hard drive, or other memory known in the art.

Alternatively, or in addition to memory 120, computing device 110 may access data or programmable logic from an external storage medium, for example through communications subsystem 120.

Communications subsystem 120 allows computing device 110 to communicate with other devices or network elements and the design of communications subsystem 120 may be based on various types of communications being performed. Further, communications subsystem 120 may comprise a plurality of communication technologies, including any wired or wireless communication technology.

In the embodiment of FIG. 1, computing device 110 further includes a user interface (UI) 150. The user interface 150 can be any auditory, visual or a haptic feedback mechanism to provide a user with information. For example, user interface 150 could be a display screen, light, speaker, vibration mechanism, among other options.

User interface 150 can further include any input mechanisms such as, but not limited to, a keyboard, keypad, mouse, stylus, touchscreen, microphone, camera, or other input.

Communications between the various modules within a computing device can be done in a variety of ways. In the example of FIG. 1, a bus 160 is shown to allow communications between the various modules. However, this is merely provided for illustration purposes and other types of communication between modules is possible.

Figure 2:
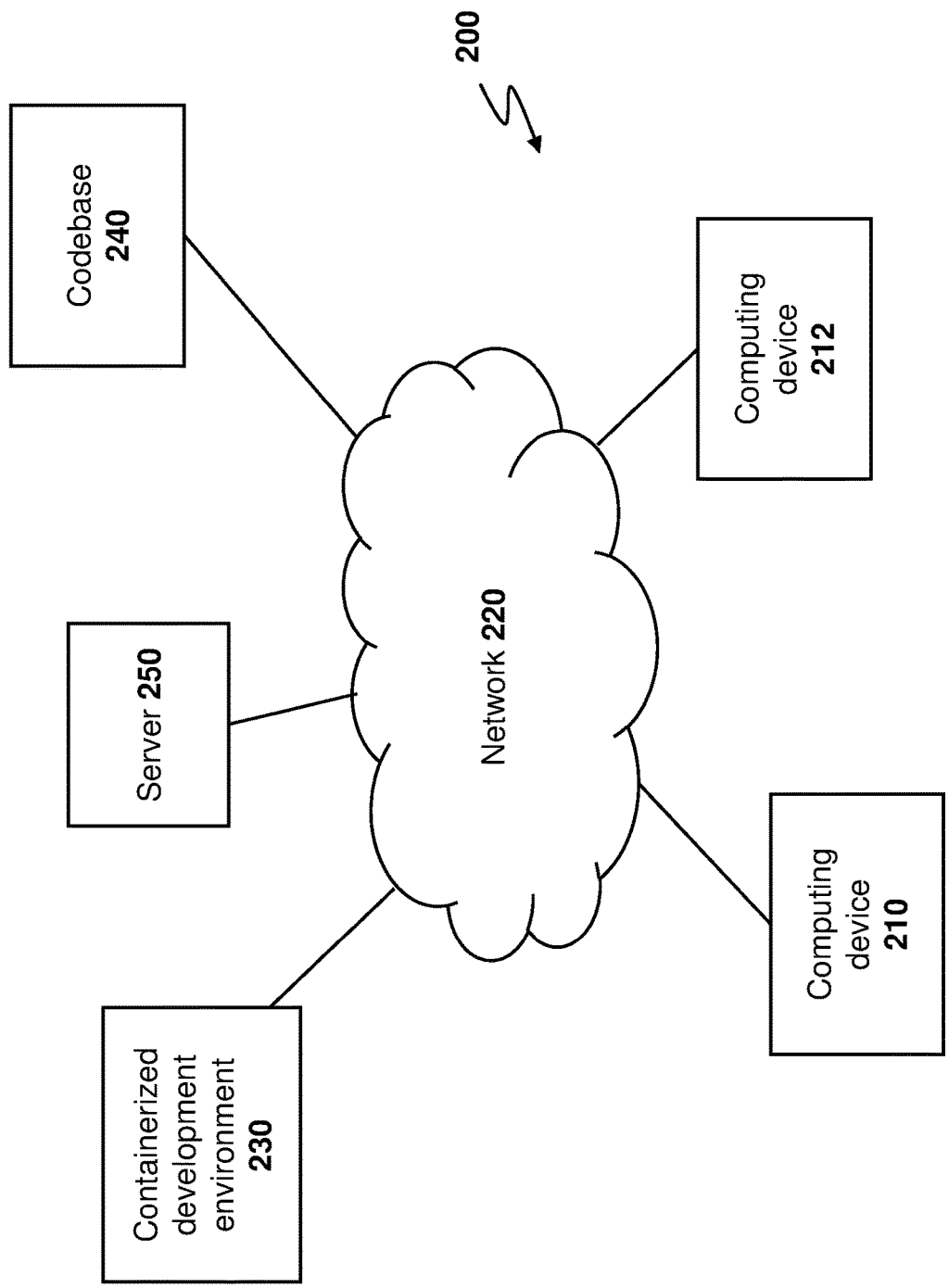
FIG. 2 is a block diagram showing an example computer system capable of being used with the embodiments of the present disclosure.

As indicated above, computing device 110 may be a stand alone, local computing device that a developer develops on. However, in other cases, a local device may be used in combination with other devices, which may use a plurality of computing devices 110. Reference is now made to FIG. 2.

In the example of FIG. 2, a simplified computing system 200 is provided. In the example of FIG. 2, a plurality of computing devices 210, 212, interact with a network 220.

For example, computing devices 210 and 212 may in some cases be different development machines being used by team members on a software development project.

Network 220 may be a local or wide area network such as the Internet.

In the example of FIG. 2, developers may utilize a containerized development environment 230, which may create the development environment on an as needed basis an in a standard format. For example, such containerized development environment may use Kubernetes with Docker containers in some cases. However, other options are also possible.

A codebase 240 may store a repository of code. For example in some cases the codebase may be a GitHub repository, which may contain one or more source code files arranged in a directory structure, and may have source code files for more than one component of one or more software applications. Other options for codebase 240 are however possible, and the use of a GitHub repository is merely provided for illustration.

In some cases, the codebase may use continuous integration (CI). CI means the regular committing of code changes to the codebase (in essence, integrating the work of multiple developers), but may include building and testing the code.

Other servers 250 could form part of the system and provide functionality including managing elements of the system, providing compiling or other support, provided web services, among other functionality.

Developing Applications Having Multiple Components

Application development often includes software that has a plurality of components, where each of these components can be compiled individually. For example, one such case involves the development of applications for a plurality of operating systems, where the user interface and some functionality can be developed independent of the operating system, and components specifically targeted to the operation system or underlying system can be developed separately. This may be used, for example, when programming for a plurality of native environments.

One example of the above is a cloud development environment in which JavaScript code is being developed for either an iOS or Android system. The "native code" for the iOS or Android system may need to be compiled separately from the JavaScript portion, and may need to be compiled in a native environment. In this regard, the compiling of the native code can take a significant amount of time, and such code may not change very frequently.

Figure 3:
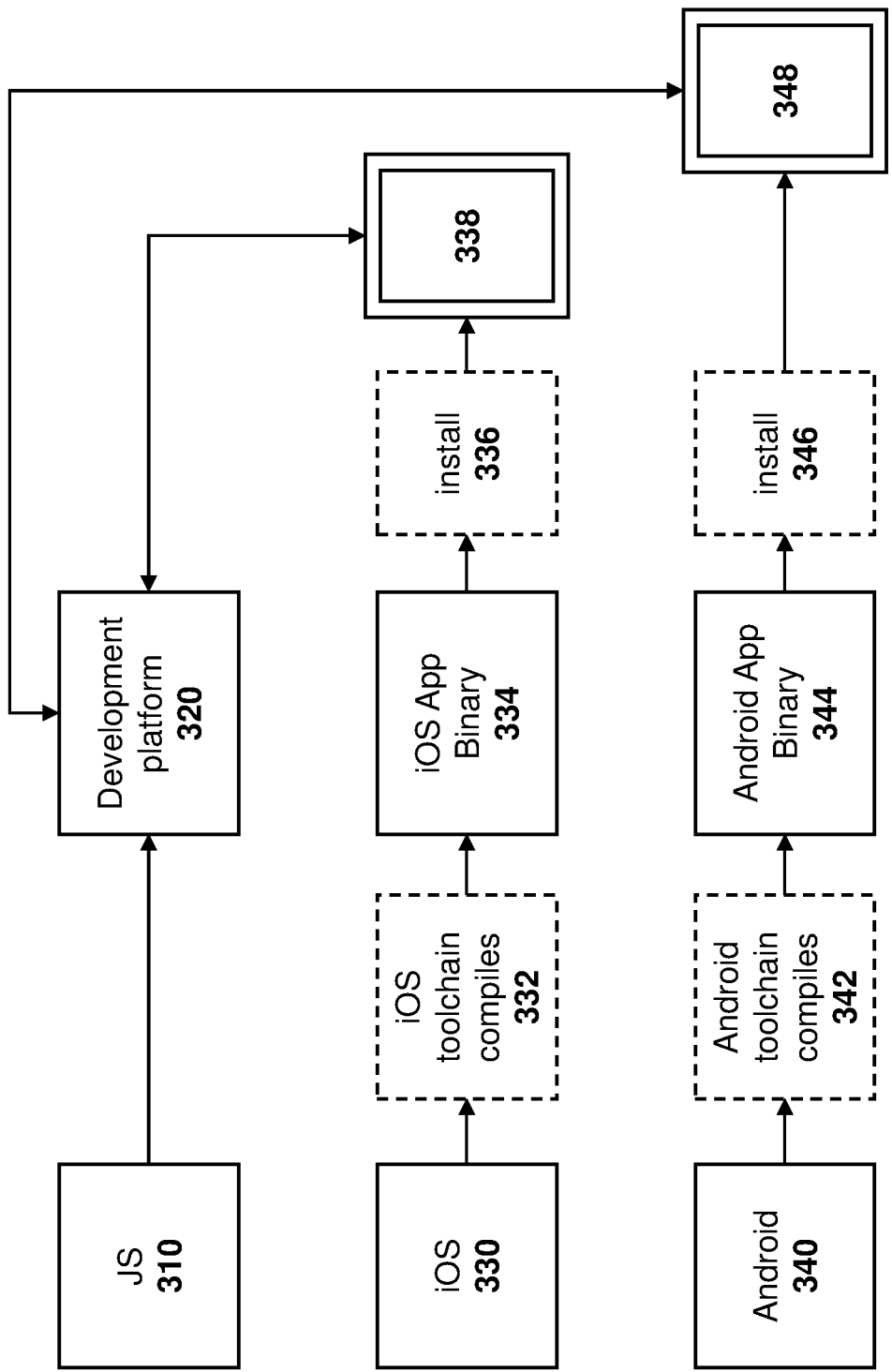
FIG. 3 is a block diagram showing the compiling of an application having a plurality of software components.

For example, reference is now made to FIG. 3. In the embodiment of FIG. 3, a developer may be developing a new application using JavaScript that is to be run on an iOS or Android device. Thus, a JavaScript codebase 310 may contain a plurality of source code files including the code that the developer is working on.

The developer may be working on development platform 320, which may interact with various simulators and with the code required for those simulators including the JavaScript codebase 310.

In the example of FIG. 3, an iOS repository or codebase 330 may contain the iOS code that the developer is working with.

Similarly, an Android repository or codebase 340 may contain the Android code that the developer is working with.

When a developer is ready to test their code, the developer may cause the iOS code the developer is working with to be compiled in the iOS toolchain block 332, which produces the iOS application binary 334. This may then be installed, shown at block 336, into an iOS simulator 338. At the same time, the development platform 320 may compile the JavaScript code that the developer is creating and also provide this to the simulator 338.

For development and testing on the Android platform, the Android code that the developer is working with may be compiled with Android toolchain at block 342, which produces the Android application binary 344. This may be installed, as shown at block 346, into a simulator 348. At the same time, the development platform 320 may compile the JavaScript code that the developer is creating and also provide this to the simulator 348.

However, as shown in FIG. 3, the native code for the iOS or Android operating systems may need to be compiled separately. This may be because the computing system that is performing the compiling may not be able to compile both Android and iOS code in some cases. In some cases, the development environment may split the native code (e.g. IOS or Android specific code) from the web application code and thus each can be compiled separately.

However, for many development projects, the native code may change infrequently and thus the compilation of this code continually during testing can waste both time and resources.

Further, the example of FIG. 3 is merely one example of a development environment in which software components can be individually compiled. Other examples of such development environments would be apparent to those skilled in the art.

Therefore, in accordance with the embodiments of the present disclosure, a software component such as the native code can be hashed to create a signature, which can then be compared against cached signatures to determine whether recompiling is needed. In many cases the signature will match a cached binary signature, and the binary can then be retrieved without requiring compilation. If compiling is needed, the newly compiled component may be stored in the cache with its signature for future developer needs.

Figure 4:
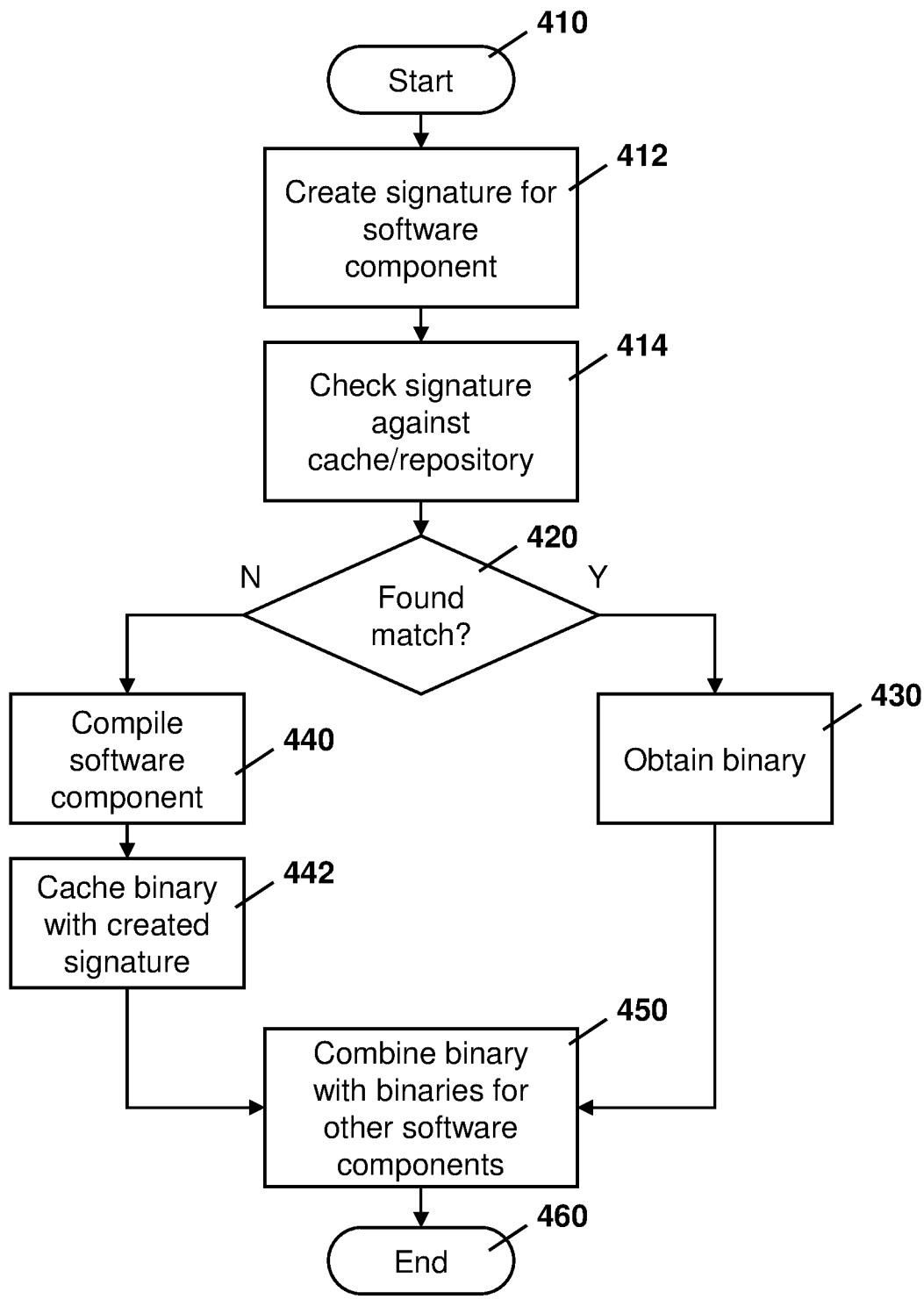
FIG. 4 is a process diagram showing a method for calculating a signature for a software component and using the signature to determine whether a binary for the software component already exists.

In particular, reference is now made to FIG. 4, which shows a process of using signatures to check whether source code needs to be compiled or not.

The process of FIG. 4 starts at block 410 and proceeds to block 412, in which a signature can be built for the source code for a particular software component. In one example, the source code may be input as a string into a hashing algorithm such as MD5. Specifically, MD5 is an algorithm which hashes 512 bit strings, along with a previous 128 bit message digest value, until a string has been fully hashed. The output from MD5 is a 128 bit message digest value. By hashing the source code in this way, a unique signature value for the source code is provided.

However, other options for hashing are possible and the present disclosure is not limited to the MD5 algorithm.

The software component may, in some cases, be a tree of source code. However, the tree of source code that is being hashed to create the signature may not be the whole project, whole repository, or whole file structure, but instead just a subset of it, for example a subset of folders, a subset of filetypes, among other options. In this way, the software component being hashed to create the signature may be only a portion of the codebase.

Further, the hashing at block 412 may be modified in various ways. In some cases, the path for the source code file can be included in the string that is being hashed. For example, the path can be included at the beginning, at the end, or at a specific point within the source code string being provided to the hashing function.

In some cases, rather than including the source code path within the hashing function, the source code path can be added after hashing has been completed and be left in plain text.

In some cases, the source code string can be hashed first, and then the hash of the source code string can be hashed with the source code path.

Further, in some cases the source code may comprise multiple files. The signature in this case may be obtained by hashing each of the files individually, in some cases with their path, and then combining the individual hashes together.

Other options are possible. Specifically, the chosen hashing algorithm and process can be set based on operational requirements, as long as the hashing algorithm and the process for hashing produces the same signature each time it is run on the same source code.

Such hashing therefore creates a "fingerprint" for the source code. The fingerprint (signature) is not used for security, but rather to uniquely identify the source code provided to the hash function.

As will be appreciated by those in the art, a signature created by hashing can overcome deficiencies in the use of timestamps to determine whether code has changed. For example, using only a timestamp such as last access time ("atime"), if a developer opens a file but makes no changes, this may update the timestamp and require the code to be recompiled. Waiting for code to recompile under such circumstances may waste significant developer time and resources.

Further, the use of signatures can be beneficial in multi-user environments. In operation, multiple developers may work on the same codebase and have access to a cache of pre-built binaries. When a developer is ready to test the application, the system may create a hash for the various independent components of the application build. In this way, a developer does not need to track whether another developer has changed code that is part of a codebase, especially in a continuous integration/continuous deployment environment.

Using the signature created at block 412, the process next proceeds to block 414. In accordance with the embodiments of the present disclosure, a cache for binaries may be maintained, where each binary is associated with a signature for the binary. The signature can be created from the source code and uniquely identify the binary.

Thus, at block 414, the signature for the source code may be used to query a cache to determine whether the binary for that software component has already been built. As described above, the software component may be a subset of the file structure for example one file only, or a subset of folders, file types, among other options, and the signature is associated with such component. The indexing in the cache corresponds with the subset of folders/files/filetypes for which the signature was obtained at block 412.

The process then proceeds to block 420 in which a check is made to determine whether a match was found. If yes, the process proceeds to block 430 in which the binary associated with the source code is obtained. For example, the binary might be downloaded in some cases.

From block 420, if the check finds that no binary exists with a matching signature, the process proceeds to block 440 in which a binary may be created. For example, this may be done by pushing the code to a Continuous Integration/Continuous Deployment (CI/CD) system, and compiling it to create the new binary.

In other cases, the code may be compiled in other ways than a CI/CD system.

The process then proceeds to block 442, in which the binary may be cached along with the signature created at block 412, for developers to use in the future. In some cases, rather than using the signature created at block 412, the signature may be re-created by the computing system doing the compiling prior to the caching.

From block 430, or from block 442, the process may proceed to block 450 in which the binary that has been obtained, either from the cache or by compiling, may be combined with binaries for other software components for the software build.

The process then proceeds to block 460 and ends.

The method of FIG. 4 can be used in different development environments. For example, reference is now made to FIG. 5.

Figure 5:
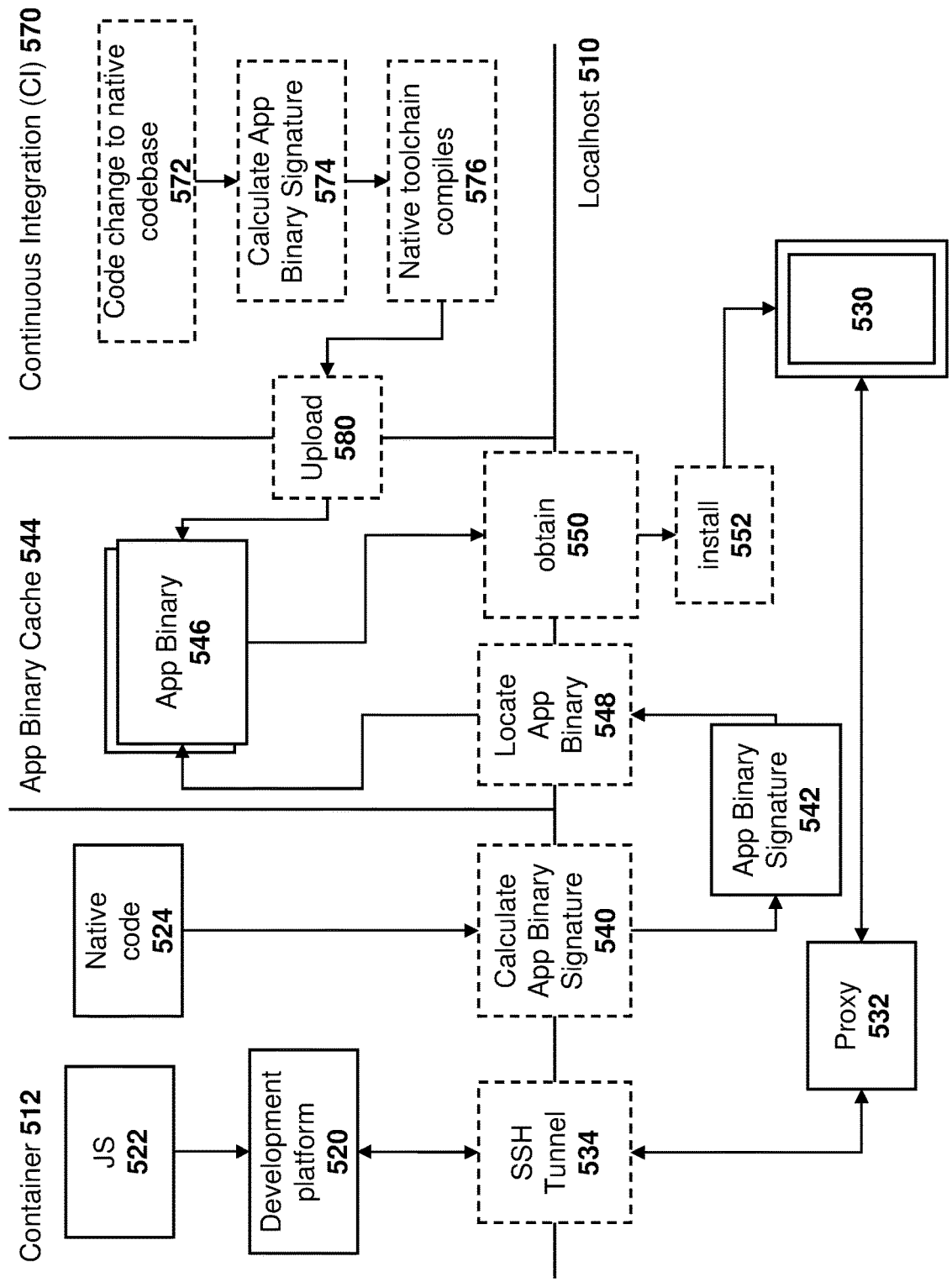
FIG. 5 is a block diagram showing a first development environment for use with the method of FIG. 4.

In the embodiment of FIG. 5, a localhost 510 may be the computing device that a developer is using. The localhost may utilize a containerized development environment within container 512 for the development of code. In particular, upon starting the containerized development environment within container 512, the developer may use the development platform 520 to create code. The development platform 520 may have access to a JavaScript codebase 522. Further, the container may also have access to a native (e.g. IOS, Android, etc.) code base 524.

A simulator 530 may run on localhost 510. In order to allow the simulator to communicate with the development platform 520, a proxy 532 may be placed between the simulator 530 and the development platform 520. Access may be granted through a Secure Shell Protocol (SSH) tunnel 534 in some cases.

Once the developer is ready to test the software on the simulator 530, the developer may launch a command from the development platform 520. This may cause the calculation of the application binary signature at block 540 for native code 524. The signature is provided to block 542.

The local host may then see whether the application binary exists within an application binary cache 544 and in particular may check whether the signature associated with the software component exists within block 546 of cache 544. A locate function 548 may be used for this.

If the binary exists based on the signature, the binary may be obtained at block 550 and installed into the simulator 530 at block 552.

Conversely, if the binary does not exist, as determined based on the signature at block 548, then the code change may be provided to a continuous integration platform 570, which may change the code to the native code base at block 572, calculate the application binary signature at block 574, and compile the code at compiler toolchain block 576.

The compiled binary, along with the application signature, may then be uploaded at block 580 to the application binary cache 544.

As will be appreciated by those in the art, the binary and signature may be stored together, or a database or table with a reference pointing to the binary may be stored with the signature, among other options.

In some cases, the environment of FIG. 5 allows for a team of developers to coordinate and work on software together. Specifically, in a multi-developer environment, one developer may modify the various underlying native code, which may result in a new binary for such code, without other developers being aware of the change. For example, the development environment may be a CI/CD environment in which code changes by one developer are automatically or otherwise frequently uploaded to a repository, compiled, tested, and/or deployed. Specifically, continuous integration means that new code changes to an application are regularly committed and, e.g., built and tested on, e.g., a shared computing platform. Such code changes (and, e.g., any resultant builds) may then be used in another developer's development environment.

The embodiment of FIG. 5 therefore provides one option for a development environment.

Figure 6:
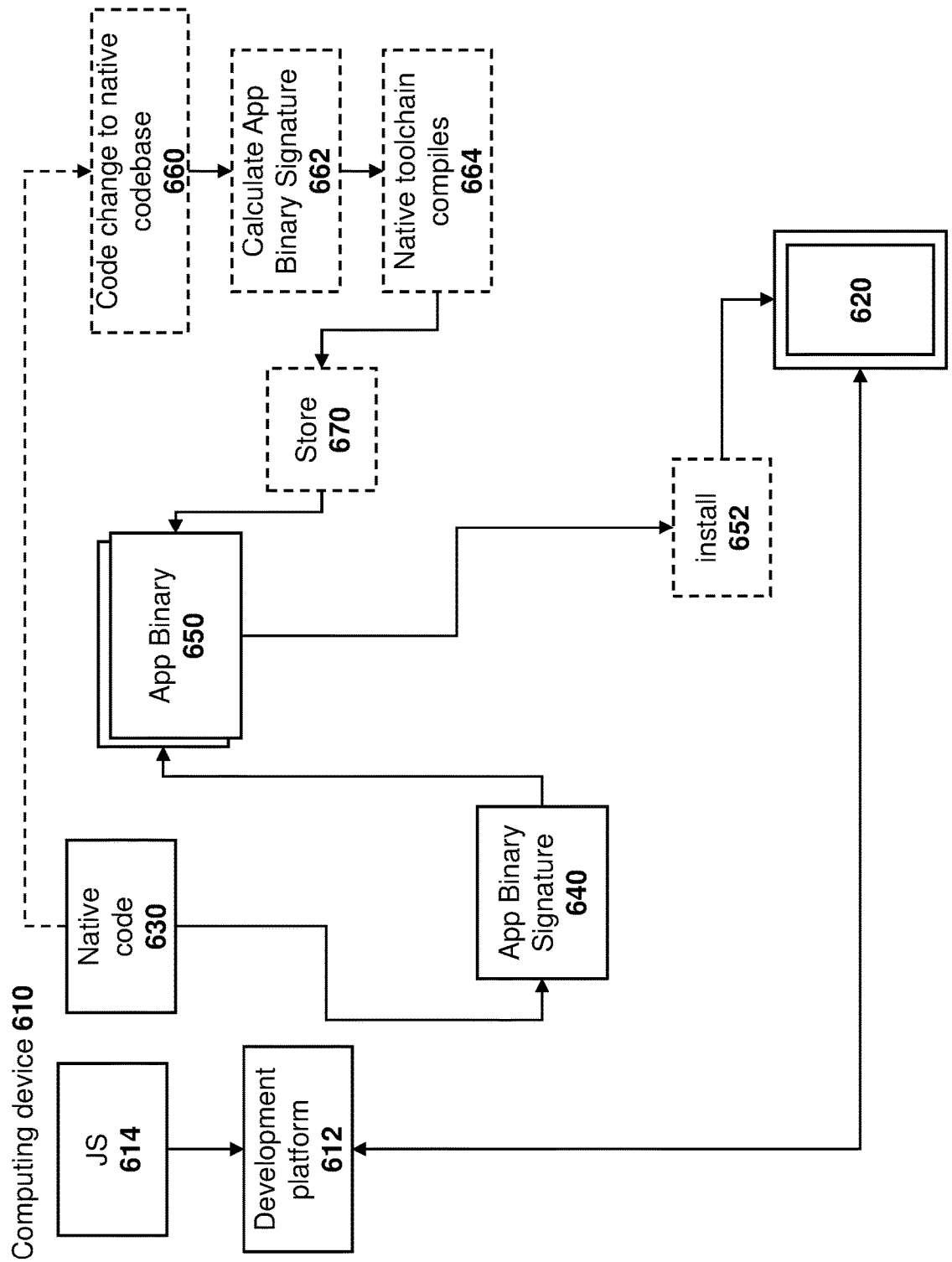
FIG. 6 is a block diagram showing a second development environment for use with the method of FIG. 4.

However, in other cases the developer may be developing in other environments. For example, reference is now made to FIG. 6. In the embodiment of FIG. 6, a developer may be developing on a local machine rather than a containerized development environment. In this case, the computing device 610 may include a development platform 612. The development platform may interact with a first codebase 614 and further with a simulator 620.

A native codebase 630 may further run on or be accessible from the computing device 610.

The computing device 610, when the developer is ready to test on the simulator 620, may cause the application binary signature to be found at block 640.

A repository can then be checked to determine whether a binary exists for the signature that was found at block 640. In some cases, the application binary cache 650 may be on computing device 610. In other cases, it may be on a remote computer and accessed through computing device 610.

In some cases, if the binary exists, it may be obtained from the cache and installed into simulator 620 at block 652.

If no binary with the same signature is found then, in some cases, the native codebase may be changed at block 660, the binary signature may be calculated at block 662, and the code compiled at block 664.

At block 670, the compiled binary, along with the calculated signature, may be stored within the application binary cache 650.

In this way, software components may not have to be compiled if no changes were made to such software components, saving computing resources and developer time.

The elements described and depicted herein, including in flow charts and block diagrams throughout the figures, imply logical boundaries between the elements.

However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above, and combinations thereof may be embodied in computer executable code that, when executing on one or more computing devices, performs the steps thereof. In another aspect, the methods may be embodied in systems that perform the steps thereof and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

The invention claimed is:

1. A method at a computing system, the method comprising:
    creating a signature for a software component, the signature being created by hashing source code for the software component;
    checking a cache to determine whether the signature matches a cached signature;
    responsive to the signature matching a cached signature, obtaining a binary for the software component from another computing system without compiling the software component; and
    combining the binary obtained from the another computing system with one or more binaries created by compiling a second software component to create a software build.

2. The method of claim 1, wherein the hashing comprises:
hashing the source code and a path for a source code file containing the source code for the software component.

3. The method of claim 2, further comprising:
performing the hashing the source code and the path for multiple source code files; and
combining results from the performing to create the signature.

4. The method of claim 1, wherein the hashing comprises:
hashing the source code; and
appending a path for a source code file containing the source code for the software component.

5. The method of claim 1, wherein the hashing uses an MD5 hashing algorithm.

6. The method of claim 1, wherein the software component is based on a development copy of a codebase, the codebase comprising source code for a plurality of software components, the plurality of software components including the software component.

7. The method of claim 6, wherein a subset of the plurality of software components are based on native code and a second subset of the plurality of software components are based on web application code.

8. A computing device comprising:
a processor; and
memory for storing instruction code, which, when executed by the processor of the computing device, cause the computing device to:
create a signature for a software component, the signature being created by hashing source code for the software component;
check a cache to determine whether the signature matches a cached signature;
when the signature matches a cached signature, obtain a binary for the software component from another computing system without compiling the software component; and
combine the binary obtained from the another computing system with one or more binaries created by compiling a second software component to create a software build.

9. The computing device of claim 8, wherein the computing device is further caused to, when the signature does not match a cached signature:
compile source code for the software component;
create a component signature for the software component; and
cache the compiled source code for the software component with the component signature.

10. The computing device of claim 8, wherein the hashing comprises:
hashing the source code and a path for a source code file containing the source code for the software component.

11. The computing device of claim 10, wherein the computing device is further caused to:
perform the hashing the source code and the path for multiple source code files; and
combine results from the performing to create the signature.

12. The computing device of claim 8, wherein the hashing comprises:
hashing the source code; and
appending a path for a source code file containing the source code for the software component.

13. The computing device of claim 8, wherein the hashing uses an MD5 hashing algorithm.

14. The computing device of claim 8, wherein the software component is based on a development copy of a codebase, the codebase comprising source code for a plurality of software components, the plurality of software components including the software component.

15. The computing device of claim 14, wherein a subset of the plurality of software components are based on native code and a second subset of the plurality of software components are based on web application code.

16. A non-transitory computer readable medium for storing instruction code, which, when executed by a processor of a computing device cause the computing device to:
create a signature for a software component, the signature being created by hashing source code for the software component;
check a cache to determine whether the signature matches a cached signature;
when the signature matches a cached signature, obtain a binary for the software component from another computing system without compiling the software component; and
combine the binary obtained from the another computing system with one or more binaries created by compiling a second software component to create a software build.

17. The non-transitory computer readable medium of claim 16, wherein the instruction code further cause the computing device to, when the signature does not match a cached signature:
compile source code for the software component;
create a component signature for the software component; and
cache the compiled source code for the software component with the component signature.

18. The non-transitory computer readable medium of claim 16, wherein the hashing comprises:
hashing the source code and a path for a source code file containing the source code for the software component.

19. The non-transitory computer readable medium of claim 16, wherein the instruction code further causes the computing device to:
perform the hashing the source code and the path for multiple source code files; and
combine results from the performing to create the signature.

20. The non-transitory computer readable medium of claim 16, wherein the hashing comprises:
hashing the source code; and
appending a path for a source code file containing the source code for the software component.

* * * * *